US012217883B1

(12) United States Patent
Chen et al.

(10) Patent No.: US 12,217,883 B1
(45) Date of Patent: Feb. 4, 2025

(54) METHOD FOR ASSEMBLING AN ADJUSTABLE COLLIMATOR FOR SPATIALLY FRACTIONATED RADIATION THERAPY

(71) Applicant: Sichuan Cancer Hospital, Chengdu (CN)

(72) Inventors: Meihua Chen, Chengdu (CN); Zengyi Fang, Chengdu (CN); Jinyi Lang, Chengdu (CN); Pingjin Zou, Chengdu (CN); Shixuan Zhao, Chengdu (CN)

(73) Assignee: Sichuan Cancer Hospital, Chengdu (CN)

( * ) Notice: Subject to any disclaimer, the term of this patent is extended or adjusted under 35 U.S.C. 154(b) by 0 days.

(21) Appl. No.: 18/918,325

(22) Filed: Oct. 17, 2024

(51) Int. Cl.
*G21K 1/02* (2006.01)
*G21K 1/04* (2006.01)

(52) U.S. Cl.
CPC .................................... *G21K 1/04* (2013.01)

(58) Field of Classification Search
None
See application file for complete search history.

(56) References Cited

U.S. PATENT DOCUMENTS

| | | | | |
|---|---|---|---|---|
| 6,185,278 | B1 * | 2/2001 | Appleby | G21K 1/025 378/149 |
| 6,389,108 | B1 * | 5/2002 | Ein-Gal | G21K 1/04 378/150 |
| 9,315,663 | B2 * | 4/2016 | Appleby | B23P 15/246 |
| 2003/0189174 | A1 * | 10/2003 | Tanaka | G21K 1/025 250/363.03 |

* cited by examiner

*Primary Examiner* — Hoon K Song
(74) *Attorney, Agent, or Firm* — Andrew D. Fortney; Central California IP Group, P.C.

(57) ABSTRACT

A method for assembling an adjustable collimator for spatially fractionated radiation therapy is disclosed. Penetrating sheets that can transmit rays are stacked to form penetration sections, and the quantity of penetrating sheets is calculated. The thickness of each penetration section corresponds to the width of each radiation area. Shielding sheets that can block rays are stacked to form shielding sections, and the quantity of shielding sheets is calculated, with the thickness of each shielding section corresponding to the spacing between the radiation areas. The penetration sections and shielding sections form a collimation module, with shielding sections on opposite sides. Penetration and shielding sections of different thicknesses are assembled based on the radiation range and the radiation area spacing. Since the thickness of the penetration and shielding sections can be adjusted as needed, it can be applied to spatially fractionated radiation therapy with different requirements, achieving cost reduction.

8 Claims, 4 Drawing Sheets

METHOD FOR ASSEMBLING AN ADJUSTABLE COLLIMATOR FOR SPATIALLY FRACTIONATED RADIATION THERAPY

RELATED APPLICATION(S)

This application claims the benefit of Chinese Pat. Appl. No. 202410617967.8, filed on May 17, 2024 in the National Intellectual Property Administration, PRC (CNIPA), incorporated herein by reference.

TECHNICAL FIELD

The present invention relates to the field of radiation therapy technology, specifically providing a method for assembling an adjustable collimator for spatially fractionated radiation therapy.

BACKGROUND

Spatially fractionated radiation therapy (SFRT) is a radiotherapy technique that allows the delivery of relatively high but varying radiation doses to large tumors while protecting surrounding healthy organs. Typically, lead plates with holes are used as collimators for spatially fractionated therapy. However, SFRT requires frequent adjustments of the radiation field, necessitating changes to both the radiation area and the protected area. Due to the beam width of minibeam radiation therapy (MBRT) being less than 1000 μm, the manufacturing of collimators requires precision instruments to create several micron-sized holes in the lead plate, which is technically challenging and results in high production costs. Additionally, the spacing between the holes is also on the micron scale, further complicating manufacturing and driving up costs. Consequently, existing spatially fractionated radiation therapy faces high costs due to the difficulties in manufacturing the collimators.

SUMMARY

This invention provides a method for assembling an adjustable spatially fractionated radiation therapy collimator, which is used to solve the problem of high cost in existing spatially fractionated radiation therapy due to the high machining difficulty of the collimator.

Technical Solution of the Invention

A method for assembling an adjustable collimator for spatially fractionated radiotherapy comprises the following steps:

- S1: Determining the widths of each radiation area and the distances between these areas (e.g., adjacent radiation areas);
- S2: Forming penetration sections using ray-permeable plates, calculating the number of plates needed, where the thickness of each penetration section corresponds to the width of the radiation area; and forming shielding sections using ray-blocking plates, and calculating the number of shielding plates needed, where the thickness of each shielding section corresponds to the distance between radiation areas;
- S3: Stacking the penetration and shielding sections in sequence to form a collimation module, with shielding sections on opposite sides;

- S4: Compressing the collimation module from the opposite sides to eliminate gaps between penetration sections, ensuring precise and reliable ray passage and spacing between radiation ranges.

In this solution, before each spatially fractionated radiotherapy, penetration and shielding sections are assembled based on different radiation ranges and distances, making the thickness of each penetration section correspond to the width of its radiation area, and the thickness of each shielding section correspond to the distance between radiation areas. After stacking the penetration and shielding sections, a collimator adaptable to different radiation ranges is obtained, eliminating the need to prepare a separate collimator for each therapy session, thereby reducing costs.

When the width of the radiation range is large, to address the issue of needing many penetration plates, which increases the chance of counting errors and larger discrepancies, the penetration section can include either plates of the same thickness and/or plates of different thicknesses.

In this case, larger penetration plates can be combined with smaller ones to reduce the number needed and minimize error probability. Fewer plates also means less error during stacking, addressing the issue of high error rates from multiple plates.

When the distance between radiation areas is large, to solve the problem of needing many shielding plates, similar counting errors, and significant discrepancies, the shielding section can also include either plates of the same thickness and/or plates of different thicknesses.

This solution allows for combining larger shielding plates with smaller ones, reducing both the total number of plates required and the chance of error. Again, fewer plates results in smaller errors during stacking.

To resolve the issue of misalignment of penetration or shielding plates during stacking, leading to an irregularly shaped collimation module that is difficult to secure, step S3 involves installing or assembling the collimation module using a fixed structure with positioning grooves. The width of the positioning grooves may match the width of the penetration plates, which in turn may match the width of the shielding plates.

When all penetration and shielding plates are the same width, a single positioning groove ensures perfect alignment during stacking. When the collimation module is compressed from opposite sides, it ensures even force distribution to avoid gaps and maintain precision.

If the radiation range lengths differ, plates of varying lengths may be used. The fixed structure must also accommodate these different lengths, so the fixed structure comprises two fixed plates, each with a positioning groove, connecting the two plates to either side of the collimation module.

This structure allows for the use of various lengths of penetration and shielding plates, thus reducing costs.

Preferably, in step S3, one end of the positioning groove has a positioning structure, with one end face of a shielding section of the collimation module resting against it, followed by alternating stacking of penetration and shielding sections, finishing with a shielding section in the groove.

This positioning structure provides support from below for the shielding section, allowing for easy handling and serving as support during the compression of the collimation module.

To prevent damage to the collimation module during compression, in step S4, a compressing structure that can slide against the fixed structure is used. The compressing structure fits tightly with the fixed structure.

When compressing, the movement of the compressing structure is controlled by gently tapping it, while the tight fit provides resistance against movement, lowering the pressure on the collimation module during compression and preventing damage. This tight fit also prevents the compressing structure from shifting during use, ensuring stable compression.

With varying radiation ranges, the thickness of the collimation module changes accordingly. When the module is thin, moving the plates from one end of the groove to the locating structure requires a longer distance, complicating the compression process. To mitigate this, the locating structure is connected to, but configured to slide along, the fixed structure, and the fit is tight.

The position of the locating structure is adjustable, allowing for its position to be modified before stacking, shortening the movement distance for both penetration and shielding plates, thus simplifying the assembly process. The ability to move the locating structure with less risk of damaging the module makes the process more manageable.

Preferably, the locating and compressing structures are both clips, with the clips having sliding grooves for connection to the fixed structure.

The thickness range of the penetration plates is 200-1000 μm; the shielding plates have a similar or identical thickness range; and the penetration plates are made by 3D-printing and comprise polylactic acid (PLA).

This approach, utilizing 3D-printed PLA plates, lowers costs while maintaining precision.

Beneficial Effects of the Invention

This invention allows for the assembly of penetration and shielding sections of varying thickness based on the radiation range and spacing. By stacking these sections to form a collimation module and compressing it to create a collimator, it can be adapted to different spatially fractionated radiotherapy requirements, achieving a reduction in costs.

BRIEF DESCRIPTION OF THE DRAWINGS

To provide a clearer illustration of the technical solutions of the present invention, the following is a brief introduction to the drawings used in the description of various embodiments. It is evident that the drawings described below show merely some embodiments of the present invention. Those skilled in the art can derive other drawings and/or embodiments from these without creative effort.

In the above drawings, the corresponding reference numerals are as follows: 1. Collimation module; 2. Fixed plate; 3. Clip; 4. Positioning groove; 5. Positioning block; 6. Recess structure or sliding groove; 7. Sliding groove; 8. U-shaped plate; 11. Penetration plate; 12. Shielding plate.

DETAILED DESCRIPTION

In conjunction with the accompanying figures, the specific implementations of the present invention clearly and comprehensively illustrate the technical solutions.

Embodiment One

Figure 3:
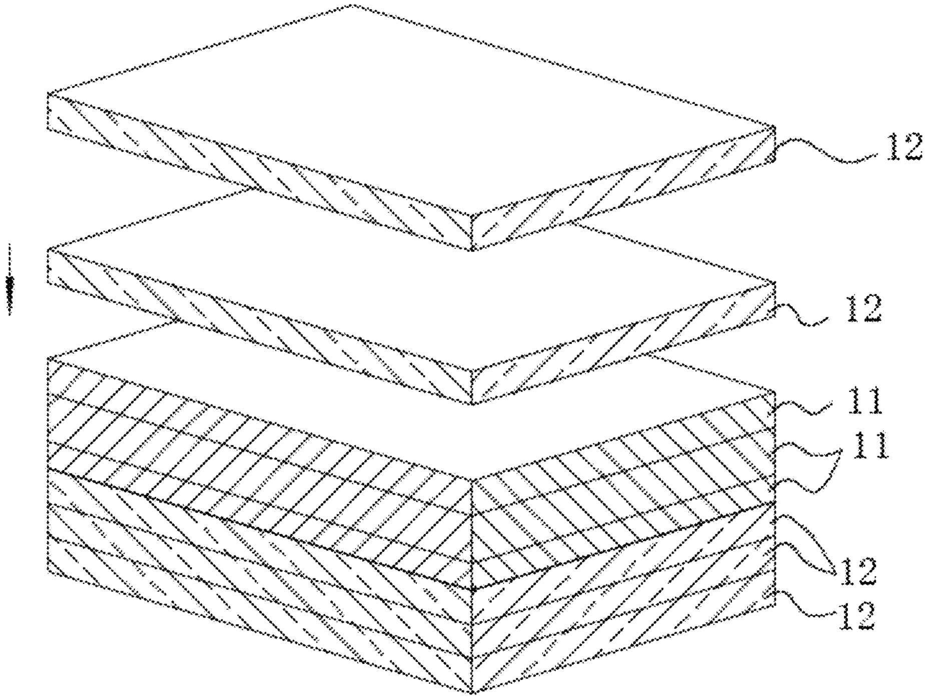
FIG. 3: Schematic diagram of the collimation module in Embodiment 1.

As shown in FIG. 3, this embodiment provides a method for assembling an adjustable spatially fractionated radiotherapy collimator, including the following steps:

S1: Measure or determine the width of each radiation area and the spacing between adjacent ones of the radiation areas. The width of each radiation area corresponds to the thickness of each penetrating part or section, and the spacing corresponds to the thickness of each shielding part or section. Since the widths and spacings of radiation areas may differ, they must be individually measured or determined, including the sequence of radiation areas, for easier assembly.

S2: Stack ray-transparent sheets (e.g., sheets that are transparent or substantially transparent to the radiation used in the SFRT) to form the penetrating parts, calculate the number of ray-transparent sheets needed, with the thickness of each penetrating part corresponding to the width of the radiation area. Stack ray-blocking sheets (e.g., sheets that are opaque or substantially opaque to the radiation used in the SFRT) to form the shielding parts, calculating the number of sheets needed, with the thickness of each shielding part corresponding to the spacing between radiation areas. For example, if the first radiation area is 600 μm wide, three 200 μm sheets can be stacked to form the penetrating part; if the second radiation area is 700 μm wide, a 500 μm sheet and a 200 μm sheet can be combined.

S3: Sequentially stack the penetrating parts and shielding parts to form a collimator module, with shielding parts on opposite sides or ends of the stack. For example, the outermost parts or sections of the stack are shielding parts or sections.

S4: Compress the collimator module from the opposite sides or ends to eliminate gaps between the penetrating parts, ensuring precise and reliable radiation coverage. This compression improves the collimator's accuracy, preventing gaps that could lead to inaccuracies.

Figure 5:
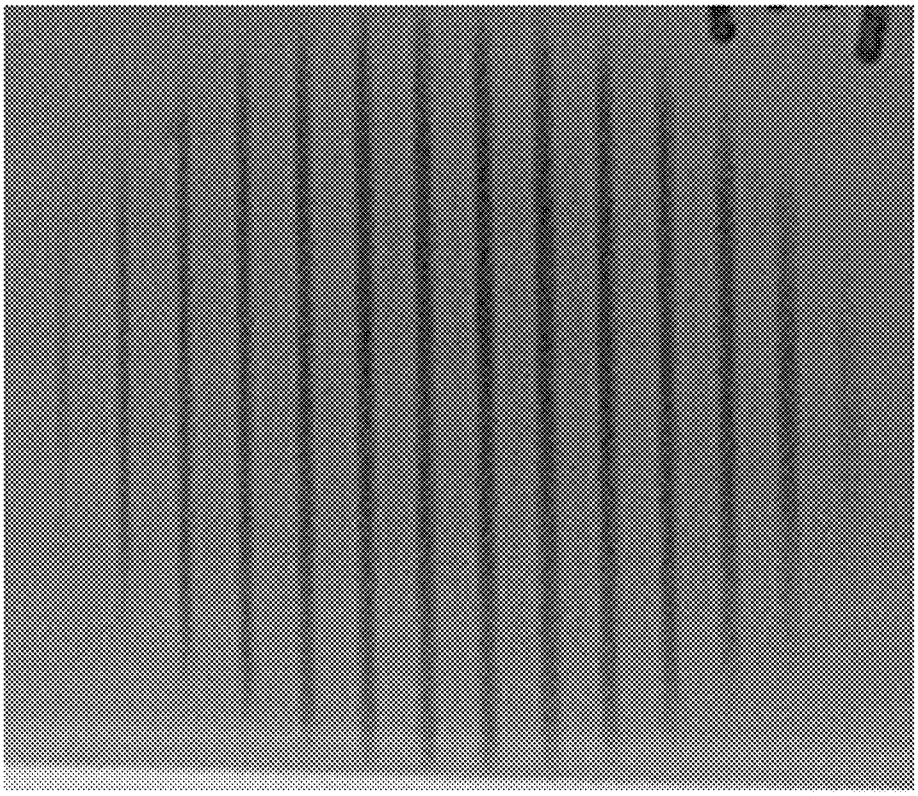
FIG. 5: Image showing the effect of the radiation beam in Embodiment 1.

As shown in FIG. 5, when the radiation beam strikes the collimator module, it passes through the penetrating parts, creating spaced strip-like irradiation zones in the targeted treatment areas, resulting in a heterogeneous dose distribution.

Figure 1:
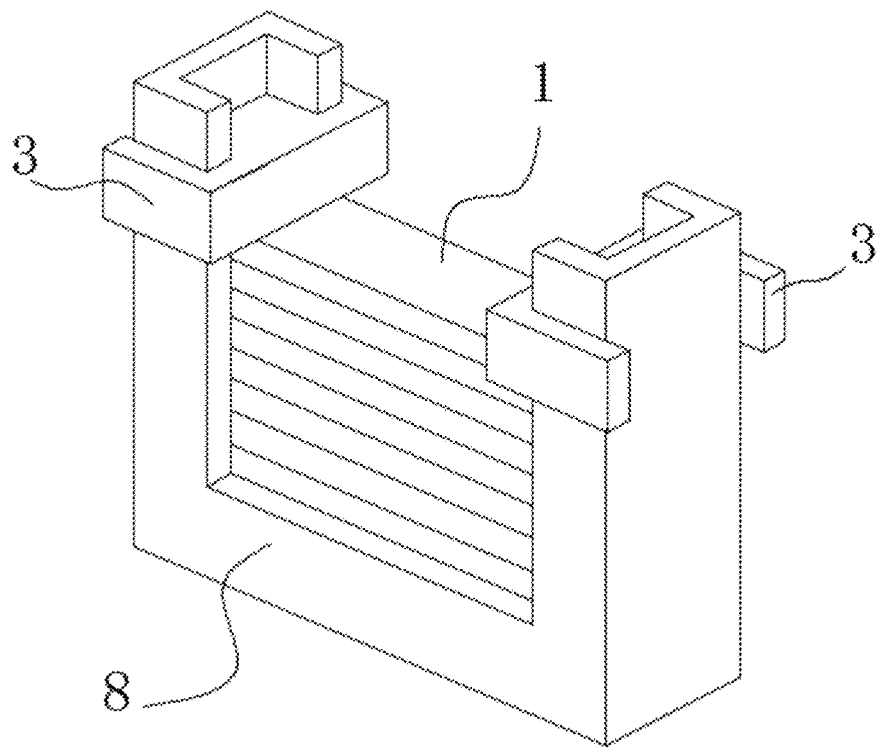
FIG. 1: Schematic diagram of the collimator structure in Embodiment 1.

As shown in FIG. 1, the collimator module 1 is secured through a fixed structure 8, a positioning structure (e.g., the base of the U-shaped structure 8 in FIG. 1), and compression structures 3 to prevent loosening of the collimator module 1, ensuring that the shielding parts tightly compress the penetrating parts of collimator module 1 for accurate radiation beam dimensions. The alternating layers in the collimator module 1 shown in FIG. 1 are the shielding parts and the penetrating parts, respectively.

When there are two or more penetrating parts, their thicknesses may differ to meet varying therapeutic specifications or requirements.

Figure 2:
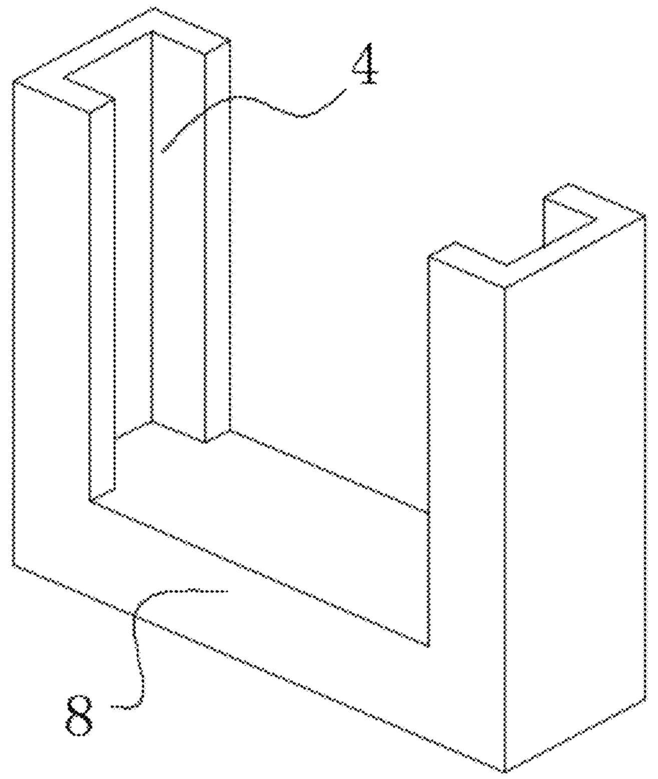
FIG. 2: Schematic diagram of the U-shaped plate in Embodiment 1.

As illustrated in FIG. 2, the fixed structure can comprise a U-shaped plate 8 with parallel inner surfaces or sidewalls that have positioning grooves 4 therein. The positioning grooves 4 may have widths that match the widths of the penetrating and shielding sheets to ensure complete overlap and/or acceptable alignment of the penetrating and shielding sheets in the collimator module 1.

The horizontal part of the U-shaped plate can serve as a positioning structure to support the collimator module 1 from below.

Figure 4:
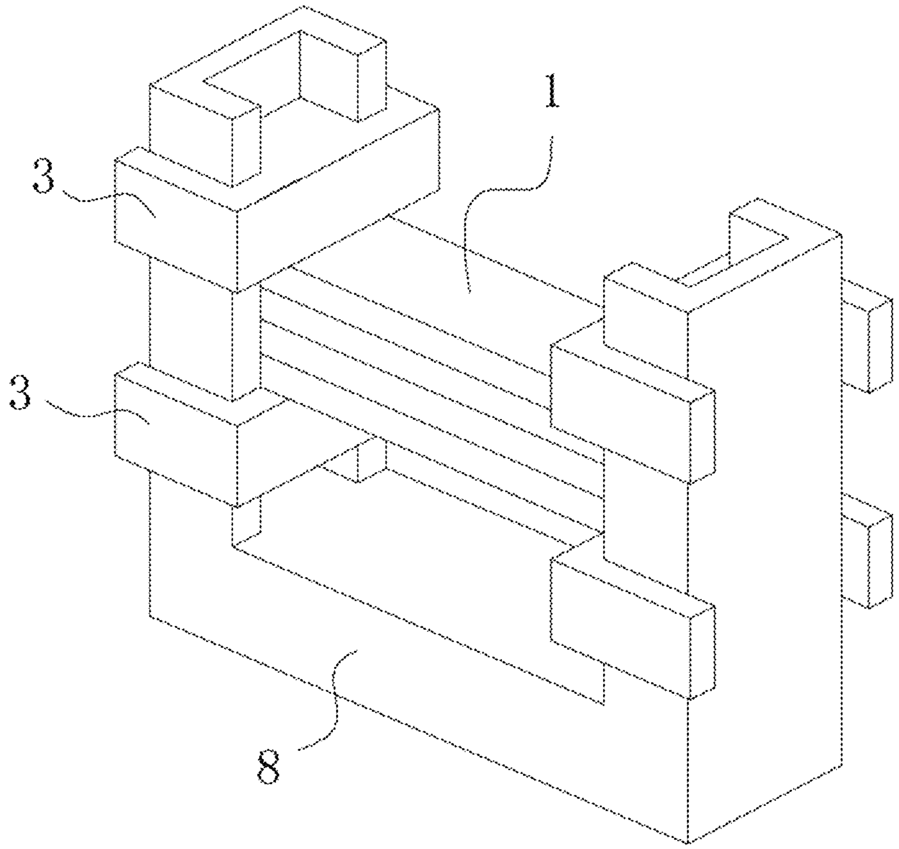
FIG. 4: Schematic diagram of an alternative embodiment of the collimator in Embodiment 1.

As shown in FIG. 4, a separate positioning structure (e.g., a separate set of clips 3 below the collimator module 1) can be set on the U-shaped plate 8, which can utilize the same design as the compression structures 3 to reduce costs.

Figure 6:
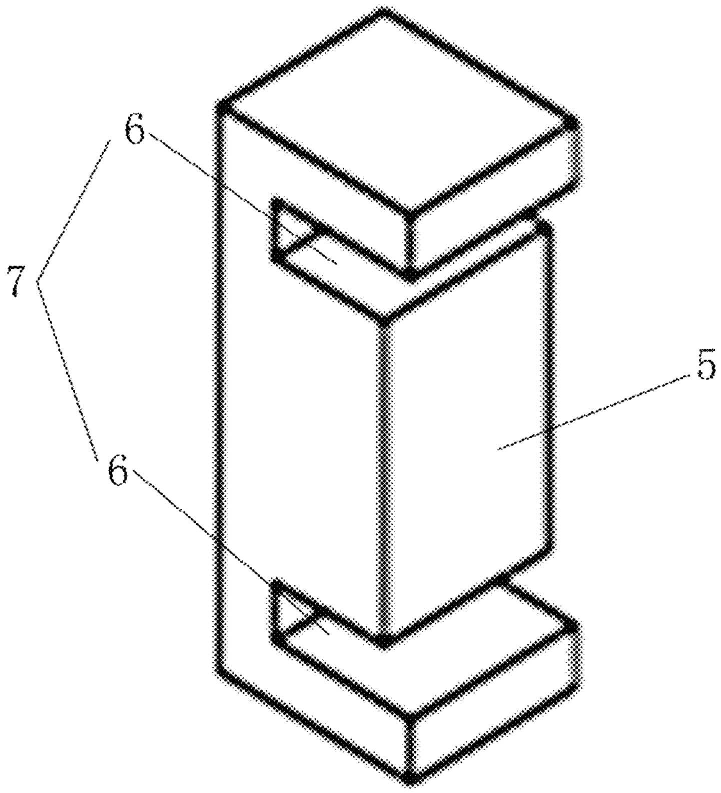
FIG. 6: Schematic diagram of the clip structure in Embodiment 1.

As depicted in FIG. 6, the positioning and compression structures 3 may comprise clips, which are rectangular structures with sliding grooves 6 having a width matching the thickness of the extensions on opposite sides of the positioning groove 4 in the U-shaped plate 8, allowing the clips to slide along the length of the positioning groove 4. Each U-shaped plate 8 may have four clips 3 positioned on opposite sides or ends of the collimator module. The clips 3 compress the end faces of the collimator module 1, ensuring that the shielding and penetrating parts are compressed and/or tightly fit to another, eliminating gaps for accurate radiation beam sizing.

Positioning blocks within the sliding grooves, with widths matching the positioning grooves 4, help prevent angular misalignment of the clips. When the positioning blocks are in place, they divide the sliding groove into two separate recesses.

The clips 3 can be secured to the U-shaped plates 8 by an interference fit.

That is, the positioning and compression structures 3 can slide relative to the fixed structure 8, with interference fit for secure attachment.

The shielding parts may comprise tungsten, which has a higher density than lead, is less prone to deformation, and is non-reactive with particles and non-toxic, effectively addressing the drawbacks of lead while eliminating associated toxic hazards and waste disposal costs. Alternative materials for the shielding parts may include bismuth, rhenium, or thorium.

The penetrating parts may comprise polylactic acid (PLA), which allows good radiation passage without affecting intensity. Other suitable materials include polyethylene terephthalate (PET), polyethylene terephthalate glycol (PETG), an acrylonitrile-butadiene-styrene (ABS) copolymer, or a polycarbonate (PC).

The shielding parts can comprise sheets of the same or varying thicknesses.

For example, all shielding sheets can have the same thickness, or some can have a different thickness from others.

The same applies to the penetrating sheets.

An exemplary thickness range for the shielding sheets is 200-1000 μm, while the penetrating sheets also have a thickness in the range from 200-1000 μm.

In the above steps, PLA sheets may be produced via 3D printing. For example, design software may be used to model rectangular PLA sheets with thicknesses ranging from 200-1000 μm, and the PLA sheet model may be exported as an STL file and sliced using Bambu Studio software (available from Bambu Lab, Shenzhen, China). 3D printing parameters to be set may include initial layer speed, fill speed, outer and inner wall speeds, and material specifications.

Embodiment Two

This embodiment offers a method for assembling an adjustable spatially fractionated radiotherapy collimator, differing from Embodiment One primarily in the fixed structure.

Figure 7:
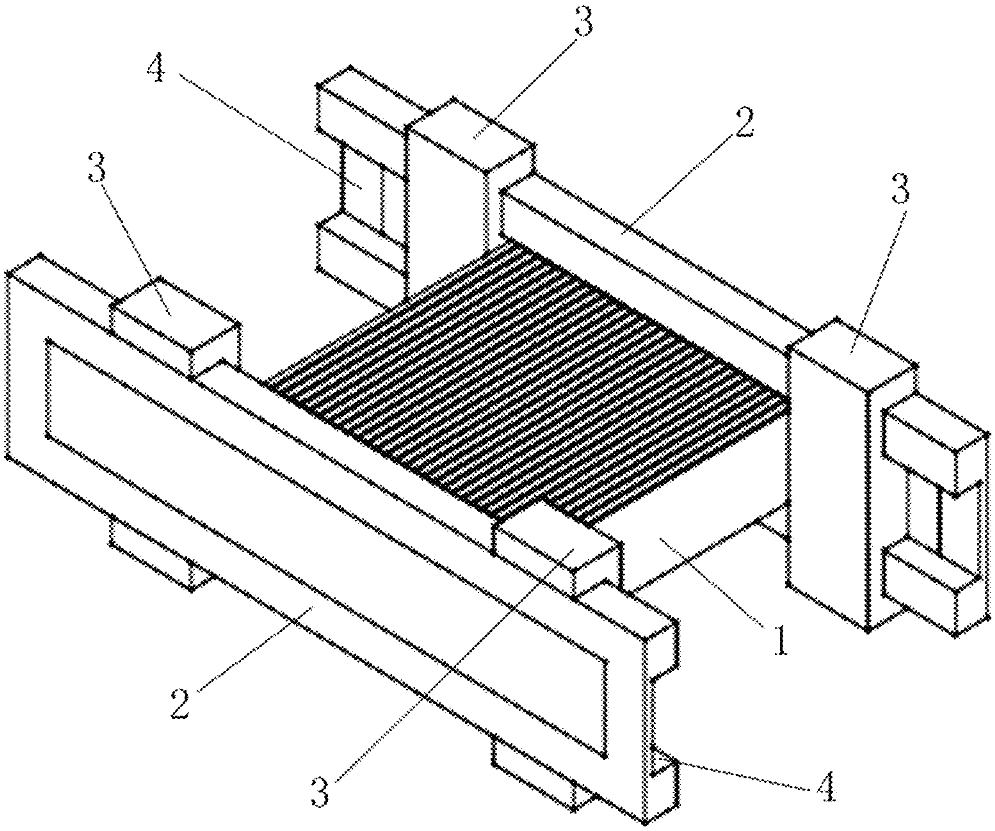
FIG. 7: Schematic diagram of the collimator structure in Embodiment 2.
Figure 8:
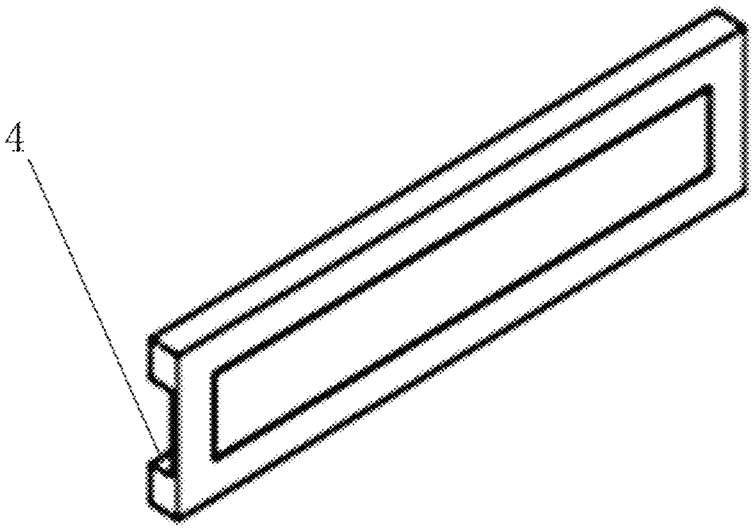
FIG. 8: Schematic diagram of the fixed plate in Embodiment 2.

As shown in FIGS. 7 and 8, the fixed structure comprises two rectangular plates 2, each featuring positioning grooves 4 matching the width (e.g., the smallest of the three Cartesian dimensions) of the collimator module 1, allowing the module 1 to fit into the grooves 4. The widths of the shielding and penetrating parts are the same, ensuring simultaneous constraint and acceptable alignment.

When two fixed components (e.g., clips 3) are inserted on either side of the collimator module 1 (e.g., in each of the positioning grooves 4), it is constrained within the grooves 4, permitting movement only along the length of the grooves 4. Both the shielding and penetrating parts are planar structures, oriented perpendicularly to the fixed plates 2.

The widths of the sliding grooves in the clips 3 correspond to the thickness of the extensions along opposite sides of the positioning grooves 4 in the fixed plates 2, allowing the clips 3 to slide along the length of the fixed plates 2. Each fixed plate 2 has two clips 3 that compress the collimator module 1 from opposite sides or ends, ensuring tight contact between the shielding and penetrating parts for precise radiation beam dimensions.

When the length of the radiation area varies, different lengths of penetrating and matching shielding sheets can be stacked to form the collimator module 1. This design allows the fixed structure to accommodate varying lengths of sheets, thereby reducing costs.

What is claimed is:

1. A method for assembling an adjustable collimator for spatially fractionated radiation therapy, comprising the following steps:

step S1: counting widths of each radiation area and spacing between the radiation areas;

step S2: calculating a number of penetrating sheets that can transmit rays, stacked to form penetration sections, with a thickness of each penetration section corresponding to the width of each radiation area, and calculating a number of shielding sheets that can block rays, stacked to form shielding sections, with a thickness of each shielding section corresponding to the spacing between radiation areas;

step S3: sequentially stacking the penetration sections and the shielding sections to form a collimation module, with shielding sections on opposite sides of the collimation module; and step S4: compressing the collimation module from the opposite sides to eliminate gaps between the penetration sections, ensuring that a range of rays transmitted through the penetration sections is accurate and reliable, and that a spacing between radiation ranges is precise and reliable, wherein the step S3 further comprises installing the collimation module using a fixed structure with positioning grooves, where the positioning grooves have a same width as that of the penetrating sheets, and the width of the penetrating sheets is the same as that of the shielding sheets, one end of the positioning grooves has a positioning structure, with an end face of one shielding section of the collimation module resting against the positioning structure; followed by alternating stacking the penetration sections and the shielding sections, with a last stacked section in the positioning groove being one of the shielding sections.

2. The method according to claim 1, wherein the penetrating sheets have a same thickness or different thicknesses.

3. The method according to claim 1, wherein the shielding sheets have a same thickness or different thicknesses.

4. The method according to claim 1, wherein the fixed structure includes two fixed plates, each fixed plate having one of the positioning grooves, and the two fixed plates contact opposite sides of the collimation module through the positioning grooves.

5. The method according to claim 1, wherein in step S4, the collimation module is compressed using a compressive structure that can slide with respect to the fixed structure, and the compressive structure fits tightly with the fixed structure.

6. The method according to claim 5, wherein the positioning structure is slidably connected to the fixed structure, and the positioning structure fits tightly with the fixed structure.

7. The method according to claim 6, wherein both the positioning structure and the compressive structure comprise a latch, where the latch includes a sliding groove, and the latch slidably connects to the fixed structure through the sliding groove.

8. The method according to claim 1, wherein the thickness of the penetrating sheets is 200-1000 μm;

the thickness of the shielding sheets is 200-1000 μm; and the penetrating sheets comprise polylactic acid and are made by 3D printing.

* * * * *